(12) United States Patent
Qu et al.

(10) Patent No.: US 12,009,680 B2
(45) Date of Patent: Jun. 11, 2024

(54) CHARGING CIRCUIT, CHARGING METHOD, AND TERMINAL

(71) Applicant: GUANGDONG OPPO MOBILE TELECOMMUNICATIONS CORP., LTD., Guangdong (CN)

(72) Inventors: Chunying Qu, Guangdong (CN); Shiming Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 497 days.

(21) Appl. No.: 17/397,489

(22) Filed: Aug. 9, 2021

(65) Prior Publication Data

US 2021/0367436 A1   Nov. 25, 2021

Related U.S. Application Data

(63) Continuation of application No. PCT/CN2019/080889, filed on Apr. 1, 2019.

(51) Int. Cl.
*H02J 7/00*   (2006.01)

(52) U.S. Cl.
CPC ......... *H02J 7/0042* (2013.01); *H02J 7/0013* (2013.01)

(58) Field of Classification Search
CPC ............................. H02J 7/0013; H02J 7/0042
See application file for complete search history.

(56) References Cited

U.S. PATENT DOCUMENTS 8,884,589 B2   11/2014   Knowlton et al.

FOREIGN PATENT DOCUMENTS

| CN | 105515075 A | | 4/2016 |
|---|---|---|---|
| CN | 105656141 A | | 6/2016 |
| CN | 106100057 A | | 11/2016 |
| CN | 106208201 A | | 12/2016 |
| CN | 106786978 A | * | 5/2017 |
| CN | 106786978 A | | 5/2017 |
| CN | 106790785 A | | 5/2017 |

(Continued)

OTHER PUBLICATIONS

Extended European Search Report for EP application 19922499.9 mailed Jan. 12, 2022. (8 pages).

(Continued)

*Primary Examiner* — Robert Grant

(74) *Attorney, Agent, or Firm* — Young Basile Hanlon & MacFarlane, P.C.

(57) ABSTRACT

Disclosed in embodiments of the present application are a charging circuit, a charging method, a terminal and a computer storage medium, the charging circuit comprising a charging interface, a control circuit, a connector and a battery; the control circuit, the connector and the battery being disposed between the charging interface and a motherboard of the terminal; the charging interface being configured so as to, after a connection is established between the terminal and a power supply providing device, access a charging current and a charging voltage; the control circuit being configured to control a conducting pathway between the charging interface and the connector, so as to transfer charging current and charging voltage entering the charging interface to the battery via the connector, so as to charge the battery.

11 Claims, 5 Drawing Sheets

(56) References Cited

FOREIGN PATENT DOCUMENTS

| | | |
|---|---|---|
| CN | 106160097 B | 7/2018 |
| CN | 109378891 A | 2/2019 |
| WO | 2017201737 A1 | 11/2017 |

OTHER PUBLICATIONS

International search report with English Translation for PCT/CN2019/080889 mailed Jan. 9, 2020 (12 pages).
Chinese First Office Action with English Translation for CN Application 201980090531.5 mailed Sep. 29, 2023. (13 pages).
Chinese Second Office Action, Chinese Application No. 201980090531.5, mailed Apr. 8, 2024, 12 pages.

\* cited by examiner

US 12,009,680 B2

CHARGING CIRCUIT, CHARGING METHOD, AND TERMINAL

CROSS-REFERENCE TO RELATED APPLICATION(S)

The present application is a continuation-application of International (PCT) Patent Application No. PCT/CN2019/080889 filed on Apr. 1, 2019, the content of which is hereby incorporated in its entirety by reference.

TECHNICAL FIELD

Embodiments of the present application relate to charging technology of the field of terminals, and in particular, to a charging circuit, a charging method, and a terminal.

BACKGROUND

When a terminal establishes a connection with a power supply providing device, the power supply providing device can output a charging current and a charging voltage to charge a battery of the terminal. At present, in a process of charging a terminal, a charging current and a charging voltage input by a power supply providing device need to pass through many components, such as a universal serial bus (USB) interface, a flexible printed circuit board (FPC), a main board, a board-to-board connector (BTB), etc., and then is transmitted to a battery. However, in a case of charging with a large current, in such a long current path formed by multiple components, every component will generate much heat, such that a temperature of the terminal increases quickly, and safety is low.

SUMMARY

An embodiment of the present application provides a charging circuit applied in a terminal, the charging circuit comprises a charging interface, a control circuit, a connector, and a battery electrically connected in sequence; wherein the battery is configured to be connected with a motherboard of the terminal to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery.

An embodiment of the present application provides a charging method applied in a terminal, wherein the terminal comprises a charging circuit, the charging circuit comprises a charging interface, a control circuit, a connector, and a battery electrically connected in sequence; the battery is configured to be connected with a motherboard of a terminal to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery; wherein the charging method comprises: receiving a charging current and a charging voltage by the charging interface; controlling, by the control circuit, a pathway between the charging interface and the connector to conduct; and transferring, by the connector, the charging current and the charging voltage input from the charging interface to a battery to charge the battery.

An embodiment of the present application provides a terminal, the terminal comprises: a motherboard; and a charging circuit; wherein the charging circuit comprises a charging interface, a control circuit, a connector, and a battery electrically connected in sequence; the battery is connected with the motherboard to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery.

DETAILED DESCRIPTION

Technical solutions in embodiments of the present application will be described clearly and entirely below in company with drawings of the embodiments of the present application. It can be understood that the specific embodiments described here are only intended to illustrate related application, but are not limitation to the present application. In addition, it needs to note that the drawings only show parts relating to the related application for easy description.

Figure 1:
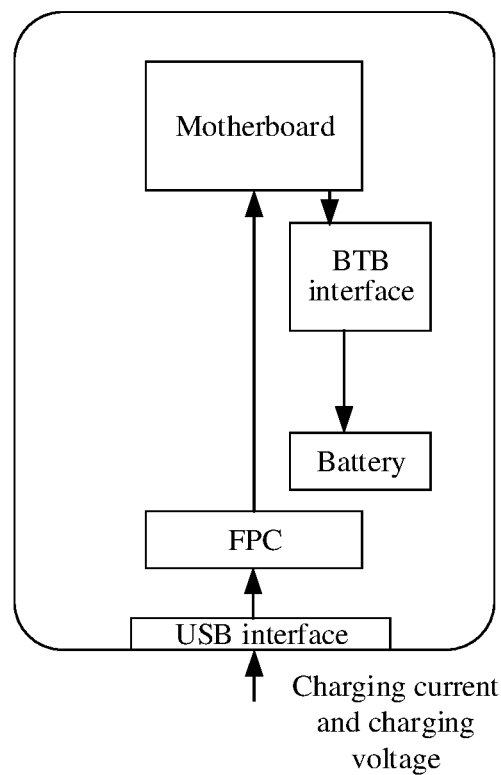
FIG. 1 is a schematic diagram of a conventional current pathway.

When a terminal is being charged, a charging current and a charging voltage input via a power supply providing device generally need to pass through a pathway formed by components, such as a USB interface, an FPC, a motherboard, a BTB interface, etc., and then can be transmitted to a battery. Wherein, the USB interface is used to establish a connection with the power supply providing device and input the charging current and the charging voltage transmitted from the power supply providing device; the FPC is used to implement a connection between the USB interface and the motherboard; the motherboard integrates main components of the terminal, such as an audio chip, a radio frequency module, etc.; the BTB interface is a connection interface integrating the motherboard with the battery together. FIG. 1 is a schematic diagram of a conventional current pathway, as shown in FIG. 1, the charging current and the charging voltage, after inputting to the USB interface, will flows into the motherboard via the FPC, and then flows from the motherboard into the battery via the BTB interface. It can be seen that a current pathway from the USB interface to the battery is long, and components in this current pathway will generate heat during charging, therefore it will be caused that a temperature of the terminal increases quickly during charging, and safety and reliable of the terminal is lowered. Although the prior art makes optimization by reducing pathway impedances of these components as much as possible, for example, increasing a contact area of the USB interface, widening the FPC connected with USB interface, widening motherboard routes, increasing a contact area of the BTB interface of the battery, and so on, the current pathway from the USB interface to the battery is not optimized in the aspect of structure, and a distance of the current pathway from the USB interface to the battery is not effectively shortened either.

A charging method provided by an embodiment of the present application changes a structure of a current pathway, then can not only achieve reduction of heat generated by components by reducing the number of components in the current pathway, but also achieve reduction of heat generated in the current pathway by reducing a pathway length of the current pathway. Thus, when the terminal is being charged, it is possible to reduce heat in the current pathway, decrease a temperature of a terminal effectively, and improve safety and reliability of the terminal.

A first aspect of the present application provides a charging circuit applied in a terminal, comprising: a charging interface, a control circuit, a connector, and a battery electrically connected in sequence; wherein, the battery is configured to be connected with a motherboard of the terminal to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery.

In some embodiments, the control circuit comprises a switch; the switch is configured to enable the control circuit to conduct the pathway between the charging interface and the connector, and thereby establish a connection between the charging interface and the connector.

In some embodiments, the battery comprises any one of a mono battery, a parallel dual battery, and a serial dual battery.

In some embodiments, the battery is a mono battery; in response to that the pathway between the charging interface and the connector is conducted, the charging interface is electrically connected with the connector via the control circuit; the connector is electrically connected with the battery.

In some embodiments, the battery is a serial dual battery, the serial dual battery is integrated in a battery protection plate, and the connector comprises a charging connector and a discharging connector; the charging interface is electrically connected with the charging connector via the control circuit; the charging connector is connected with the battery protection plate; the battery protection plate is electrically connected with the motherboard of the terminal via the discharging connector.

A second of the present application provides a charging method applied in a terminal, wherein the terminal comprises a charging circuit, the charging circuit comprises a charging interface, a control circuit, a connector, and a battery electrically connected in sequence; the battery is configured to be connected with a motherboard of a terminal to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery; wherein the charging method comprises: receiving a charging current and a charging voltage by the charging interface; controlling, by the control circuit, a pathway between the charging interface and the connector to conduct; and transferring, by the connector, the charging current and the charging voltage input from the charging interface to a battery to charge the battery.

In some embodiments, the control circuit comprises a switch; the controlling, by the control circuit, a pathway between the charging interface and the connector to conduct comprises: enabling the control circuit by the switch to conduct the pathway between the charging interface and the connector and establish the connector between the charging interface and the connector.

In some embodiments, the battery comprises any one of a mono battery, a parallel dual battery, and a serial dual battery.

In some embodiments, the battery is a mono battery, and the method further comprises: in response to that the pathway between the charging interface and the connector is conducted, electrically connecting, by the control circuit, the charging interface with the connector; and electrically connecting the connector with the battery.

In some embodiments, the battery is a serial dual battery, the connector comprises a charging connector and a discharging connector, the serial dual battery is integrated in a battery protection plate; and the method further comprises: electrically connecting, by the control circuit, the charging interface with the charging connector; electrically connecting the charging connector with the battery protection plate; and electrically connecting, by the discharging connector, the battery protection plate with the motherboard of the terminal.

A third aspect of the present application provides a terminal, comprising: a motherboard; and a charging circuit; wherein the charging circuit comprises a charging interface, a control circuit, a connector, and a battery electrically connected in sequence; the battery is connected with the motherboard to supply electric power to the terminal; the charging interface is configured to receive a charging current and a charging voltage; the control circuit is configured to control a pathway between the charging interface and the connector to conduct, so as to transfer the charging current and the charging voltage to the battery via the connector, and thereby charge the battery.

In some embodiments, the control circuit comprises a switch; the switch is configured to enable the control circuit to conduct the pathway between the charging interface and the connector, and thereby establish a connection between the charging interface and the connector.

In some embodiments, the battery comprises any one of a mono battery, a parallel dual battery, and a serial dual battery.

In some embodiments, the battery is a mono battery; in response to that the pathway between the charging interface and the connector is conducted, the charging interface is electrically connected with the connector via the control circuit; the connector is electrically connected with the battery.

In some embodiments, the battery is a serial dual battery; the terminal further comprises a battery protection plate, and the serial dual battery is integrated in the battery protection plate; the connector comprises a charging connector and a discharging connector, the charging interface is electrically connected with the charging connector via the control circuit, the charging connector is connected with the battery protection plate, and the battery protection plate is electrically connected with the motherboard via the discharging connector.

In some embodiments, the control circuit, the connector, and the battery are disposed between the charging interface and the motherboard.

In some embodiments, the terminal further comprises a flexible printed circuit board (FPC) electrically connected between the charging interface and the motherboard; wherein the charging current and the charging voltage do not flow into the motherboard via the FPC.

In some embodiments, the terminal further comprises a board-to-board connector (BTB) interface electrically connected between the battery and the motherboard.

In some embodiments, the motherboard is a separated motherboard or an L-shaped integral board.

In some embodiments, the terminal further comprises a processor, a memory, a communication interface, and a bus; the processor, the memory, the communication interface, and the charging circuit are electrically connected with each other by the bus.

Technical solutions in embodiments of the present application will be described below clearly and entirely in company with drawings in embodiments of the present application.

Figure 2:
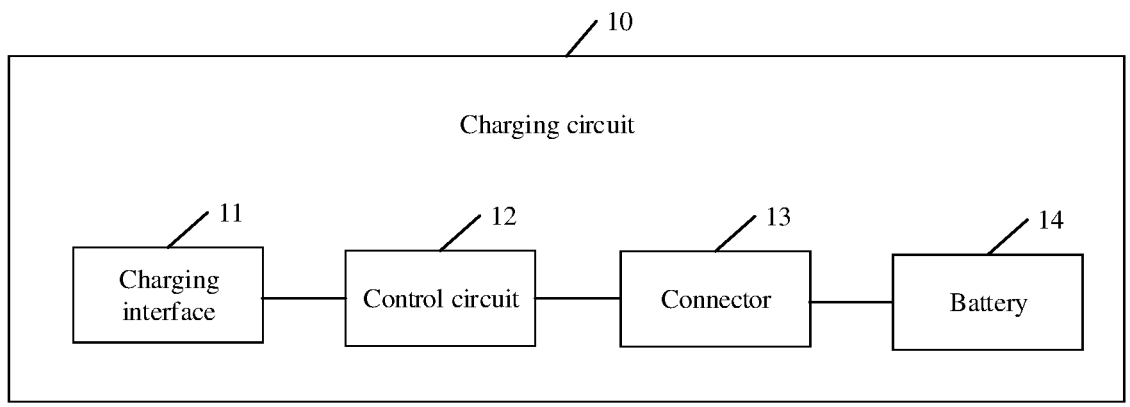
FIG. 2 is a schematic diagram of a composed structure of a charging circuit of an embodiment of the present application.

An embodiment of the present application provides a charging circuit, FIG. 2 is a schematic diagram of a composed structure of a charging circuit of an embodiment of the present application. As shown in FIG. 2, a charging circuit 10 includes a charging interface 11, a control circuit 12, a connector 13, and a battery 14.

It needs to be noted that, in this embodiment of the present application, the charging interface 11 is electrically connected with the control circuit 12; the control circuit 12 is electrically connected with the connector 13; the connector 13 is electrically connected with the battery 14. That is, in this embodiment of the present application, the charging interface 11 is configured to establish a connection with a power supply providing device and input a charging current and a charging voltage transmitted from the power supply providing device; the control circuit 12 is respectively connected with the charging interface 11 and the connector 13, such that it is possible to establish a connection between the charging interface 11 and the connector 13 when being enabled; the connector 13 is configured to integrate the control circuit 12 and the battery 14 together.

Figure 3:
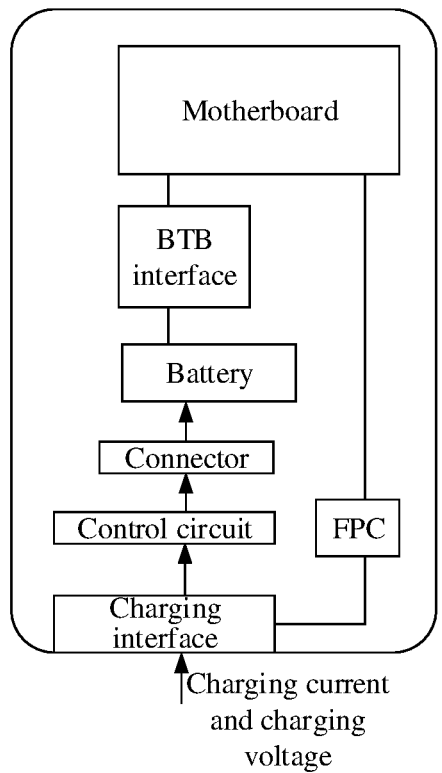
FIG. 3 is a schematic diagram of a current pathway of an embodiment of the present application.

It needs to be noted that, in this embodiment of the present application, the control circuit 12, the connector 13, and the battery 14 in the charging circuit 10 are disposed between the charging interface 11 and a motherboard of a terminal. FIG. 3 is a schematic diagram of a current pathway of an embodiment of the present application; as shown in FIG. 3, when the terminal is being charged, a current pathway can include the charging interface, the control circuit, and the connector, wherein the control circuit, the connector, and the battery are all disposed between the charging interface and a motherboard of a terminal. In comparison with the current pathway in above FIG. 1, in the terminal of the present application, the charging current and the charging voltage input by the power supply providing device first pass through the charging interface, then are transmitted to the connector via the control circuit, and finally flow into the battery through the electrical connection between the connector and the battery to perform charging. That is, although the terminal of the present application is still equipped with a motherboard and an FPC, the current pathway is only formed by the charging interface, the control circuit, and the connector. During charging, the charging current and the charging voltage no longer need to flow into the motherboard via the FPC and then be transmitted to the battery via a BTB interface, while the charging current and the charging voltage are transmitted to the battery via the control circuit and the connector directly, components in the current pathway are reduced, and thus heat generated by the components can be reduced effectively. Furthermore, since the control circuit, the connector, and the battery are all disposed between the charging interface and the motherboard of the terminal, that is, positions of components in the charging pathway are closer to each other, the charging current and the charging voltage are enabled to sequentially flow into the charging interface, the control circuit, the connector, and the battery with close positions to implement charging. As shown in above FIG. 3, if the charging interface is located at a bottom of the terminal, the control circuit and the connector are also disposed at a bottom area of the terminal, such that the current pathway from the charging interface to the battery can be further shortened on the basis of decreasing components in the current pathway, and thus when the terminal is being charged, it is possible to reduce heat generated in the current pathway and lower a temperature of the terminal effectively. In conclusion, in this embodiment of the present application, on one hand, it is possible to achieve reduction of heat generated by components by decreasing the number of components in the current pathway; on the other hand, it is possible to achieve reduction of heat generated in the current pathway by shortening a pathway length of the current pathway.

Furthermore, in an embodiment of the present application, after the terminal establishes a connection with the power supply providing device, the charging current and the charging voltage can be input via the charging interface 11.

Furthermore, in an embodiment of the present application, after the charging circuit 10 receives the charging current and the charging voltage via the charging interface 11, the control circuit 12 controls a pathway between the charging interface 11 and the connector 13 to conduct, such that the charging current and the charging voltage can be transmitted to the connector 13.

Furthermore, in an embodiment of the present application, after the connector 13 receives the charging current and the charging voltage via the control circuit 12, the charging current and the charging voltage can be transmitted to the battery 14.

Furthermore, in an embodiment of the present application, after receiving the charging current and the charging voltage, the battery 14 can be charged by the charging current and the charging voltage.

It needs to be noted that, in an embodiment of the present application, the control circuit 12 in the charging circuit 10 further includes a switch. Specifically, the charging circuit 10 can enable the control circuit 12 via the switch, so as to conduct a pathway between the charging interface 11 and the connector 13, and thus a connection between the charging interface 11 and the connector 13 can be established.

Furthermore, in an embodiment of the present application, the charging interface 11 of the charging circuit 10 can be a common USB interface, and can also be a micro USB interface, a Type C interface, etc. Specifically, the terminal can be connected with the power supply providing device via the charging interface 11.

Furthermore, in an embodiment of the present application, the connector 13 of the charging circuit 10 can be a BTB interface.

Furthermore, in an embodiment of the present application, the battery 14 can comprise any one of a mono battery, a parallel dual battery, and a serial dual battery.

Furthermore, in an embodiment of the present application, if the battery 14 is a mono battery, when the pathway between the charging interface 11 and the connector 13 is conducted, the charging interface 11 is electrically connected with the connector 13 via the control circuit 12; the connector 13 is electrically connected with the battery 14.

Furthermore, in an embodiment of the present application, if the battery 14 is a serial dual battery, the connector 13 includes a charging connector and a discharging connector, the serial dual battery 14 is integrated in a battery protection plate; correspondingly, the control circuit 12 is configured to control a pathway between the charging interface 11 and the charging connector to conduct; the charging interface 11 is electrically connected with the charging connector via the control circuit 12; the charging connector is connected with the battery protection plate integrated with the battery 14; the battery protection plate is electrically connected with the motherboard of the terminal via the discharging connector.

Furthermore, in embodiments of the present application, the terminal can is a device to be charged that is connectable with the power supply supplying device; wherein, the terminal can be any terminal with communication and storage functions, for example, terminals such as a tablet computer, a mobile phone, an e-reader, a remoter controller, a personal computer (PC), a notebook computer, a vehicular device, a network television, a wearable device, and so on.

Furthermore, in an embodiment of the present application, the power supply providing device can support a common charging mode and a quick charging mode; wherein, a charging current in the quick charging mode is larger than a charging current in the common charging mode, that is, a charging rate of the quick charging mode is larger than a charging rate of the common charging mode. Generally, the common charging mode can be considered as a charging mode of which a rated output voltage is 5V and a rated output current is less than or equal to 2.5 A. In addition, in the common charging mode, output ports D+ and D− of the power supply providing device can be short-circuited; in the quick charging mode, the power supply providing device can utilize D+ and D− to perform communication and data exchange with a mobile terminal.

Furthermore, in an embodiment of the present application, the power supply providing device can be used to charge the terminal. Specifically, the power supply providing device can be connected with the terminal via a USB interface, the USB interface can be a common USB interface, and can also be a micro USB interface, a Type C interface, etc. A power supply line in the USB interface is used for charging the terminal by the power supply providing device, wherein the power supply line in the USB interface can be a VBus line and/or an earth line of the USB interface. A data line in the USB interface can be used for dual-directional communication between the power supply providing device and the terminal, the data line can be a D+ line and/or a D− line in the USB interface; so called dual-directional communication may mean that the power supply providing device and the terminal perform information exchange.

Embodiments of the present application provide a charging circuit, the charging circuit comprises a charging interface, a control circuit, a connector, and a battery; wherein the control circuit, the connector, and the battery are disposed between the charging interface and a motherboard of a terminal; the charging interface is configured to input a charging current and a charging voltage after a connection is established between the terminal and a power supply providing device; the control circuit is configured to control a pathway between the charging interface and the connector to conduct, so as to transfer the charging current and the charging voltage input from the charging interface to the battery via the connector, and thereby charge the battery. From this, it can be seen that in embodiments of the present application, after connecting the charging current and the charging voltage input by the power supply providing device via the charging interface of the charging circuit, the terminal can transmit the charging current and the charging voltage to the connector via the control circuit, and directly input the charging current and the charging voltage to the battery via the connector. The charging circuit provided by the present application, at the same time of reducing the components in a current pathway, further dispose the charging circuit, the connector, and the battery between the charging interface and the motherboard of the terminal, such that positions of components in a charging pathway are closer to each other, and thus the current pathway from the charging interface to the battery is greatly shortened. Thus, when the terminal is being charged, it is possible to reduce heat in the current pathway, decrease a temperature of the terminal effectively, and improve safety and reliability of the terminal.

Figure 4:
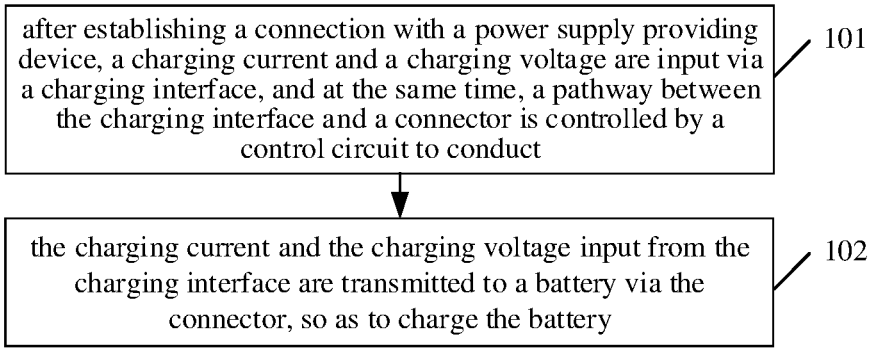
FIG. 4 is a schematic diagram of an implementation flow of a charging method of an embodiment of the present application.

Based on the above embodiments, in a further embodiment of the present application, based on the charging circuit shown in above FIG. 2, FIG. 4 is a schematic diagram of an implementation flow of a charging method of an embodiment of the present application. As shown in FIG. 4, in an embodiment of the present application, a charging method of a charging circuit can include the following operations.

Operation 101: after establishing a connection with a power supply providing device, a charging current and a charging voltage are input via a charging interface, and at the same time, a pathway between the charging interface and a connector is controlled by a control circuit to conduct.

In an embodiment of the present application, after an aforesaid terminal establishes a connection with a power supply providing device, the charging interface in a charging circuit of the terminal can receive a charging current and a charging voltage input by the power supply providing device; at the same time, the charging circuit can further control a pathway between the charging interface and the connector to conduct via the control circuit, so as to establish an electrical connection between the charging interface and the connector.

It needs to be noted that, in an embodiment of the present application, the charging circuit can include the charging interface, the control circuit, the connector, and the battery; that is, after establishing a connection with the power supply providing device, the terminal can charge the battery via the charging interface, the control circuit, and the connector.

It needs to be note that, in an embodiment of the present application, the charging interface is electrically connected with the control circuit, the control circuit is electrically connected with the connector, and the connector is electrically connected with the battery. That is, in this embodiment of the present application, the charging interface is used to establish a connection with the power supply providing device and receive the charging current and the charging voltage transmitted from the power supply providing device; the control circuit is connected with the charging interface and the connector respectively, such that a connection can be established between the charging interface and the connector when it is enabled; the connector is used to integrate the control circuit and the battery together.

Based on the above FIG. 3, when the terminal is being charged, a current pathway can include the charging interface, the control circuit, and the connector, wherein the control circuit, the connector, and the battery are all disposed between the charging interface and the motherboard of the terminal. In comparison with the current pathway in above FIG. 1, in the terminal of the present application, the charging current and the charging voltage input by the power supply providing device first pass through the charging interface, then are transmitted to the connector via the control circuit, and finally flows into the battery through the electrical connection between the connector and the battery to perform charging. That is, although the terminal of the present application is still equipped with a motherboard and an FPC, the current pathway is only formed by the charging interface, the control circuit, and the connector. During charging, the charging current and the charging voltage no longer need to flow into the motherboard via the FPC and then be transmitted to the battery via a BTB interface, but are transmitted to the battery via the control circuit and the connector directly, components in the current pathway are reduced, and thus heat generated by the components can be reduced effectively.

Furthermore, in an embodiment of the present application, the charging interface of the charging circuit can be a common USB interface, and can also be a micro USB interface, a Type C interface, etc. Specifically, the terminal can be connected with the power supply providing device via the charging interface.

It needs to be noted that, in an embodiment of the present application, the control circuit of the charging circuit can include a switch; specifically, the switch in the control circuit is used to enable the control circuit.

Furthermore, in an embodiment of the present application, the connector of the charging circuit can be a BTB.

Furthermore, in an embodiment of the present application, the battery can include any one of a mono battery, a parallel dual battery, and a serial dual battery.

Operation 102: the charging current and the charging voltage input from the charging interface are transmitted to a battery via the connector, so as to charge the battery.

In an embodiment of the present application, the terminal receives the charging current and the charging voltage input by the power supply providing device; at the same time, after the pathway between the charging interface and the connector is controlled by the control circuit to conduct, the charging circuit can transmit the charging current and the charging voltage input from the charging interface via the connector to the battery, so as to charge the battery.

Furthermore, in an embodiment of the present application, the charging circuit receives the charging current and the charging voltage via the charging interface; at the same time, after an electrical connection is established between the charging interface and the connector by the control circuit, the charging current and the charging voltage can be transmitted to the connector, thus the charging current and the charging voltage can be transmitted to the battery via the connector, and then the battery can be charged according to the charging current and the charging voltage.

It needs to be noted that, in an embodiment of the present application, there is an electrical connection between the connector of the charging circuit and the battery. Therefore, after the connector receives the charging current and the charging voltage from the charging interface via the control circuit, the charging current and the charging voltage can be transmitted to the battery via the electrical connection with the battery.

In an embodiment of the present application, furthermore, since the control circuit, the connector, and the battery are all disposed between the charging interface and the motherboard of the terminal, that is, the charging interface, the control circuit, and the connector of the charging circuit are disposed at adjacent positions in the terminal, such that the charging current and the charging voltage can sequentially flow into the charging interface, the control circuit, the connector, and the battery with close positions to implement charging. For example, if the charging interface is located at a bottom of the terminal, the control circuit and the connector are also disposed at a bottom area of the terminal, such that the current pathway from the charging interface to the battery can be further shortened on the basis of decreasing components in the current pathway, and thus when the terminal is being charged, it is possible to reduce heat generated in the current pathway and lower a temperature of the terminal effectively.

Furthermore, in an embodiment of the present application, the control circuit of the charging circuit can include a switch used to enable the control circuit; specifically, when establishing the electrical connection between the charging interface and the connector by the control circuit, the terminal can enable the control circuit by the switch, so as to establish the electrical connection between the charging interface and the connector.

It needs to be noted that, in an embodiment of the present application, the control circuit, when being in an enabling state, can establish an electrical connection between the charging interface and the connector.

Furthermore, in an embodiment of the present application, the control circuit equipped in the terminal can be an enabling switch.

In an embodiment of the present application, furthermore, the battery in the terminal can be a mono battery, and can also be a dual battery, and further can be a multi battery; wherein, the dual-battery can be a parallel dual battery or a serial dual battery.

It needs to be noted that, in an embodiment of the present application, when the battery of the terminal is a mono battery, the battery of the present application, in assembly, can be opposite to an assembly direction of a battery in the prior art, so that the current pathway from the charging interface to the battery can be further shortened.

Furthermore, in embodiments of the present application, whether the battery is a mono battery, a dual battery, or a multi battery, the assembly direction of the battery can meet the requirement of being close to the charging interface, that is, positions of the components in the charging pathway are closer to each other, such that the charging current and the charging voltage can sequentially flow into the charging interface, the control circuit, the connector, and the battery with close positions to achieving charging. Thus, the current pathway from the charging interface to the battery can be further shortened, such that when the terminal is being charged, heat generated in the current pathway can be reduced, and a temperature of the terminal can be lowered effectively.

Furthermore, in an embodiment of the present application, if the battery is a mono battery, when the pathway between the charging interface and the connector is conducted, the charging interface is electrically connected with the connector via the control circuit; the connector is electrically connected with the battery.

Furthermore, in an embodiment of the present application, if the battery is a serial dual battery, the connector includes a charging connector and a discharging connector, the serial dual battery is integrated in a battery protection plate; correspondingly, the control circuit is configured to control a pathway between the charging interface and the charging connector to conduct; the charging interface is electrically connected with the charging connector via the control circuit; the charging connector is connected with the battery protection plate integrated with the battery; the battery protection plate is electrically connected with the motherboard of the terminal via the discharging connector.

Embodiments of the present application provide a charging method applied in a charging circuit. The charging circuit includes a charging interface, a control circuit, a connector, and a battery; wherein the control circuit, the connector, and the battery are disposed between the charging interface and a motherboard of a terminal; the charging interface is configured to input a charging current and a charging voltage after a connection is established between the terminal and a power supply providing device; the control circuit is configured to control a pathway between the charging interface and the connector to conduct, so as to transfer the charging current and the charging voltage input from the charging interface to the battery via the connector, and thereby charge the battery. From this, it can be seen that in embodiments of the present application, after connecting the charging current and the charging voltage input by the power supply providing device via the charging interface of the charging circuit, the terminal can transmit the charging current and the charging voltage to the connector via the control circuit, and directly input the charging current and the charging voltage to the battery via the connector. The charging circuit provided by the present application, at the same time of reducing the number of components in a current pathway, further disposes the charging circuit, the connector, and the battery between the charging interface and the motherboard of the terminal, such that positions of components in a charging pathway are closer to each other, and thus the current pathway from the charging interface to the battery is greatly shortened. Thus, when the terminal is being charged, it is possible to reduce heat in the current pathway, decrease a temperature of the terminal effectively, and improve safety and reliability of the terminal.

Based on the above embodiments, in another embodiment of the present application, based on above FIG. 3, in the battery pathway in above FIG. 3, the motherboard of the terminal is in a broken plate design; that is, the motherboard of the terminal is a separated motherboard, and the battery in the charging circuit is a mono battery. In the terminal, the charging current and the charging voltage input by the power supply providing device first pass through the charging interface, then are transmitted to the connector via the control circuit, and finally flow into the battery through the electrical connection between the connector and the battery to perform charging. That is, although the terminal of the present application is still equipped with a motherboard and an FPC, regarding the current pathway of the present application, during charging, the charging current and the charging voltage transmitted from the charging interface no longer need to flow into the motherboard via the FPC and then be transmitted to the battery via a BTB interface, while the charging current and the charging voltage are transmitted to the battery via the control circuit and the connector directly, components in the current pathway are reduced, and thus heat generated by the components can be reduced effectively. Furthermore, since the control circuit, the connector, and the battery are all disposed between the charging interface and the motherboard of the terminal, that is, positions of components in the charging pathway are closer to each other, it is thus possible to further shorten the current pathway from the charging interface to the battery on the basis of decreasing the components in the current pathway, such that heat generated in the current pathway is reduced and a temperature of the terminal is lower effectively when the terminal is being charged.

Figure 5:
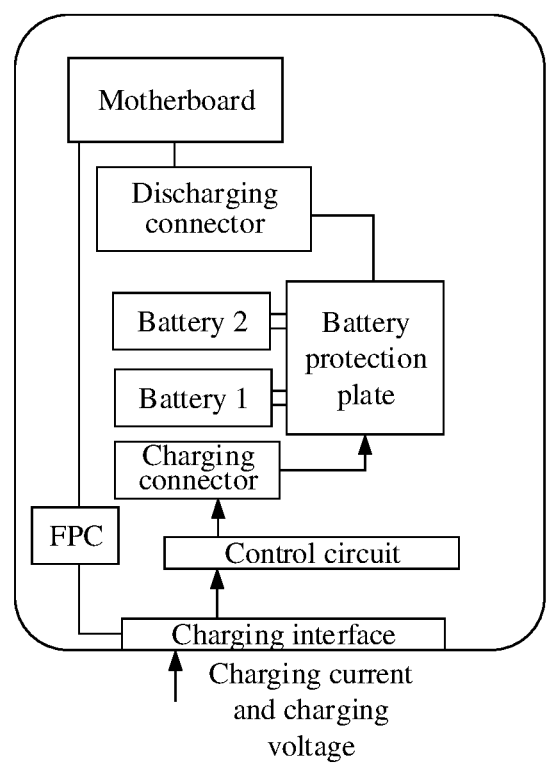
FIG. 5 is a schematic diagram of a current pathway of another embodiment of the present application.

FIG. 5 is a schematic diagram of a current pathway of another embodiment of the present application, as shown in FIG. 5, the motherboard of the terminal is in a broken plate design; that is, the motherboard of the terminal is a separated motherboard, and the battery in the charging circuit is a lateral serial dual battery. Wherein, the battery can consist of a battery 1 and a battery 2 connected in series, both the battery 1 and the battery 2 are integrated in a battery protection plate; a connector equipped for the terminal includes a charging connector and a discharging connector, and the battery protection plate is electrically connected with the motherboard via the discharging connector. Wherein, the control circuit, the charging connector, and the battery are all disposed between the charging interface and the motherboard of the terminal; in the terminal, the charging current and the charging voltage input by the power supply providing device first pass through the charging interface, then are transmitted to the charging connector via the control circuit, and finally flow into the battery through the electrical connection between the charging connector and the battery protection plate to perform charging. That is, although the terminal of the present application is still equipped with a motherboard and an FPC, regarding the current pathway of the present application, during charging, the charging current and the charging voltage transmitted from the charging interface no longer need to flow into the motherboard via the FPC and then be transmitted to the battery via a BTB interface, while the charging current and the charging voltage are transmitted to the battery via the control circuit and the connector directly, components in the current pathway are reduced, and thus heat generated by the components can be reduced effectively. At the same time, since the control circuit, the connector, and the battery are all disposed between the charging interface and the motherboard of the terminal, it is thus possible to further shorten the current pathway from the charging interface to the battery on the basis of decreasing the components in the current pathway, such that heat generated in the current pathway is reduced and a temperature of the terminal is lower effectively when the terminal is being charged.

Figure 6:
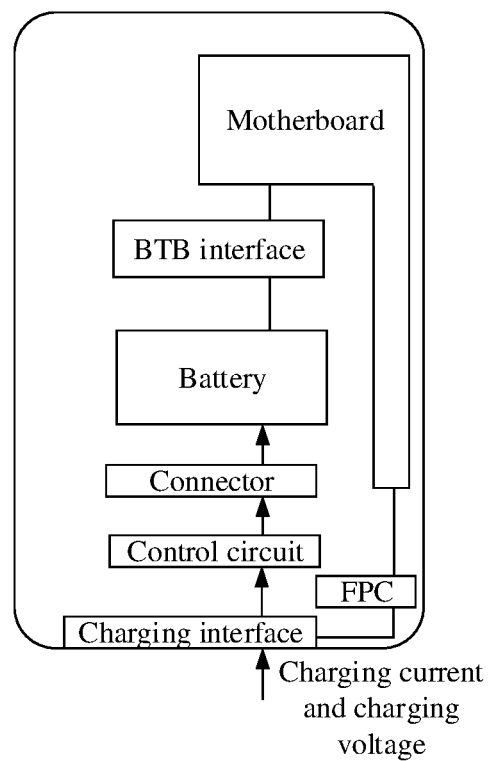
FIG. 6 is a schematic diagram of a current pathway of another embodiment of the present application.

FIG. 6 is a schematic diagram of a current pathway of another embodiment of the present application; as shown in FIG. 6, the motherboard of the terminal is in an L design, that is, the motherboard is integrated into an L-shaped integral board; the battery in the charging current is a mono battery. In the terminal, the charging current and the charging voltage input by the power supply providing device first pass through the charging interface, then are transmitted to the connector via the control circuit, and finally flow into the battery through the electrical connection between the connector and the battery to perform charging. That is, although the terminal of the present application is still equipped with a motherboard and an FPC, regarding the current pathway of the present application, during charging, the charging current and the charging voltage transmitted from the charging interface no longer need to flow into the motherboard via the FPC and then be transmitted to the battery via a BTB interface, while the charging current and the charging voltage are transmitted to the battery via the control circuit and the connector directly, components in the current pathway are reduced, and thus heat generated by the components can be reduced effectively. At the same time, since the control circuit, the connector, and the battery are all disposed between the charging interface and the motherboard of the terminal, it is thus possible to further shorten the current pathway from the charging interface to the battery on the basis of decreasing the components in the current pathway, such that heat generated in the current pathway is reduced and a temperature of the terminal is lower effectively when the terminal is being charged.

Embodiments of the present application provide a charging method applied in a charging circuit. The charging circuit includes a charging interface, a control circuit, a connector, and a battery; wherein the control circuit, the connector, and the battery are disposed between the charging interface and a motherboard of a terminal; the charging interface is configured to input a charging current and a charging voltage after a connection is established between the terminal and a power supply providing device; the control circuit is configured to control a pathway between the charging interface and the connector to conduct, so as to transfer the charging current and the charging voltage input from the charging interface to the battery via the connector, and thereby charge the battery. From this, it can be seen that in embodiments of the present application, after connecting the charging current and the charging voltage input by the power supply providing device via the charging interface of the charging circuit, the terminal can transmit the charging current and the charging voltage to the connector via the control circuit, and directly input the charging current and the charging voltage to the battery via the connector. The charging circuit provided by the present application, at the same time of reducing the number of components in a current pathway, further disposes the charging circuit, the connector, and the battery between the charging interface and the motherboard of the terminal, such that positions of components in a charging pathway are closer to each other, and thus the current pathway from the charging interface to the battery is greatly shortened. Thus, when the terminal is being charged, it is possible to reduce heat in the current pathway, decrease a temperature of the terminal effectively, and improve safety and reliability of the terminal.

Figure 7:
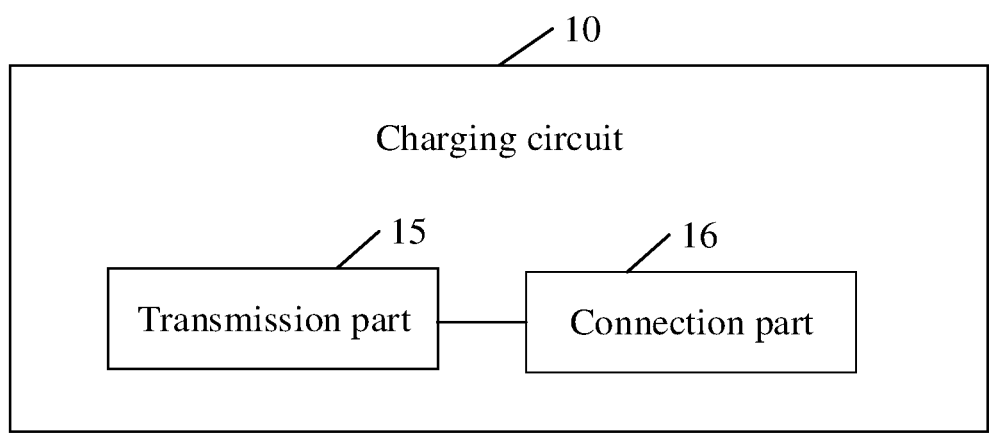
FIG. 7 is a schematic diagram of a composed structure of a charging circuit of another embodiment of the present application.

Based on the above embodiments, in another embodiment of the present application, FIG. 7 is a schematic diagram of a composed structure of a charging circuit of another embodiment of the present application. As shown in FIG. 7, a charging circuit 10 provided by this embodiment of the present application can include a transmission part 15 and a connection part 16.

The transmission part 15 is configured to receive the charging current and the charging voltage via the charging interface after establishing a connection with a power supply providing device.

The connection part 16 is configured to control the pathway between the charging interface and the connector to conduct via the control circuit after establishing a connection with a power supply providing device.

The transmission part 15 is further configured to transmit the charging current and the charging voltage input from the charging interface to the battery via the connector, so as to charge the battery.

Furthermore, in an embodiment of the present application, the control circuit 12 includes a switch.

Furthermore, in an embodiment of the present application, the connection part is specifically configured to enable the control circuit to conduct the pathway between charging interface and the connector, so as to establish a connection between the charging interface and the connector.

Figure 8:
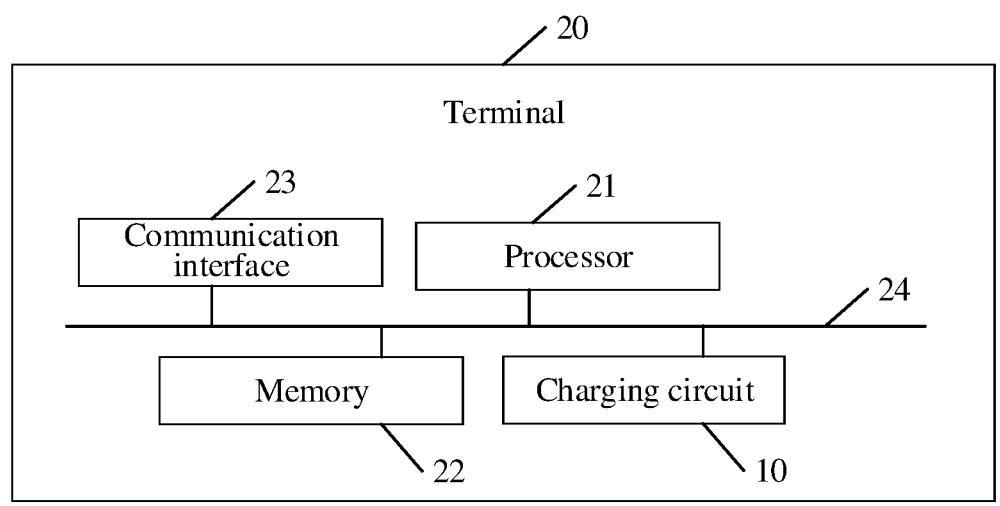
FIG. 8 is a schematic diagram of a composed structure of a terminal of an embodiment of the present application.

FIG. 8 is a schematic diagram of a composed structure of a terminal of an embodiment of the present application; as shown in FIG. 8, a terminal 20 provided by this embodiment of the present application can include a processor 21, a memory 22 storing instructions being executable by the processor 21, and the charging circuit 10; furthermore, the terminal 20 can further include a communication interface 23 and a bus 24 used to connect the processor 21, the memory 22, the charging circuit 10, and the communication interface 23.

In embodiments of the present application, the above processor 21 can be any one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, and a microprocessor. Understandably, regarding different devices, electronic components used to implement the aforesaid processor functions can also be others, which are not specifically limited by embodiments of the present application. The memory 22 is used to store executable program codes, the program codes incudes computer operation instructions; the memory 22 may include a high-speed RAM memory, and may further include non-transitory memories, for example, at least two magnetic disk memories.

In embodiments of the present application, the bus 24 is used to connect the communication interface 23, the processor 21, and the memory 22, and used for mutual communication among these components.

In embodiments of the present application, the memory 22 is used to store instructions and data.

Furthermore, in embodiments of the present application, the processor 21 is used to: receive a charging current and a charging voltage via the charging interfaced after establishing a connection with the power supply providing device; at the same time, control the pathway between the charging interface and the connector to conduct via the control circuit; and transmitting the charging current and the charging voltage input by the charging interface to the battery via the connector, so as to charge the battery.

In actual use, the aforesaid memory can be a volatile memory, such as a Random-Access Memory (RAM), a non-volatile memory, a Read-Only Memory (ROM), a flash memory, a Hard Disk Drive (HDD), a Solid-State Drive (SSD), or a combination of the memories of the aforesaid types, and provides instructions and data to the processor.

In addition, various functional modules in this embodiment may be integrated into one processing unit, or each unit may exist alone physically, or two or more units may be integrated into one unit. The above-mentioned integrated unit can be realized in the form of hardware, and can also be realized in the form of software function modules.

If an integrated unit is implemented in the form of a software function module and is not sold or used as an independent product, it can be stored in a computer readable storage medium. Based on this understanding, an essential part, in other words, a part contributes to the prior art, of the technical solution of this embodiment, or whole or parts of the technical solution, can be embodied in the form of a software product. The computer software product is stored in a storage medium and includes some instructions configured to enable a computer device (which can be a personal computer, a server, or a network device, etc.) or a processor to executes all or some of the operations of the method in this embodiment. The aforementioned storage medium includes: a U disk, a mobile hard disk, a Read Only Memory (ROM), a Random Access Memory (RAM), a magnetic disk, an optical disk, and other various media that can store program codes.

Embodiments of the present application provide a terminal, the terminal is equipped with a charging circuit. The charging circuit includes a charging interface, a control circuit, a connector, and a battery; wherein the control circuit, the connector, and the battery are disposed between the charging interface and a motherboard of the terminal; the charging interface is configured to input a charging current and a charging voltage after a connection is established between the terminal and a power supply providing device; the control circuit is configured to control a pathway between the charging interface and the connector to conduct, so as to transfer the charging current and the charging voltage input from the charging interface to the battery via the connector, and thereby charge the battery. From this, it can be seen that in embodiments of the present application, after connecting the charging current and the charging voltage input by the power supply providing device via the charging interface of the charging circuit, the terminal can transmit the charging current and the charging voltage to the connector via the control circuit, and directly input the charging current and the charging voltage to the battery via the connector. The charging circuit provided by the present application, at the same time of reducing the number of components in a current pathway, further disposes the charging circuit, the connector, and the battery between the charging interface and the motherboard of the terminal, such that positions of components in a charging pathway are closer to each other, and thus the current pathway from the charging interface to the battery is greatly shortened. Thus, when the terminal is being charged, it is possible to reduce heat in the current pathway, decrease a temperature of the terminal effectively, and improve safety and reliability of the terminal.

Embodiments of the present application provides a computer readable storage medium, which stores a program; the program, when being executed by a processor, implements the above-mentioned charging method.

Specifically, program instructions corresponding to a charging method of this embodiment can be stored in a storage medium, such as an optical disk, a hard disk, a U-disk, etc.; when the program instructions in the storage medium corresponding to the charging method are read or executed by an electronic device, the following operations are implemented.

After establishing a connection with a power supply providing device, a charging current and a charging voltage are input via a charging interface, and at the same time, a pathway between the charging interface and a connector is controlled by a control circuit to conduct.

The charging current and the charging voltage input from the charging interface are transmitted to a battery via the connector, so as to charge the battery.

Those skilled in the art should understand that embodiments of the present application can be provided as a method, a system, or a computer program product. Therefore, the present application may adopt the form of a hardware embodiment, a software embodiment, or an embodiment combining software and hardware aspects. Moreover, the present application may adopt the form of a computer program product, which is implemented on one or more computer-usable storage medium (including but not limited to a disk storage, am optical storage, etc.) containing computer-usable program codes.

The present application is described with reference to implementation flow schematic diagrams and/or block diagrams of methods, devices (systems), and computer program products according to embodiments of the present application. It should be understood that computer program instructions can realize each process and/or block in a schematic flow diagram and/or block diagram, and realize a combination of processes and/or blocks in a schematic flow diagram and/or block diagram. These computer program instructions can be provided to a processor of a general-purpose computer, a special-purpose computer, an embedded processor, or other programmable data processing devices to generate a machine, so that instructions executed by a processor of the computer or other programmable data processing devices generate a device for implementing functions specified in one process or multiple processes in an implementation flow schematic diagram and/or one block or multiple blocks in a block diagram.

These computer program instructions can also be stored in a computer-readable memory that can direct a computer or other programmable data processing devices to work in a specific manner, so that instructions stored in the computer-readable memory produce a manufactured article including an instruction device. The instruction device realizes functions specified in one process or multiple processes in an implementation flow schematic diagram and/or one block or multiple blocks in a block diagram.

These computer program instructions can also be loaded on a computer or other programmable data processing devices, so that a series of operation steps are executed on the computer or other programmable devices to produce processing implemented by a computer, such that instructions executed on the computer or other programmable devices provide operations for implementing functions specified in one process or multiple processes in an implementation flow schematic diagram and/or one block or multiple blocks in a block diagram.

The above described are only preferred embodiments of the present application and not intended to limit the protection scope of the present application.

What is claimed is:

1. A charging circuit applied in a terminal, comprising:
   a charging interface, a control circuit, a connector, and a battery electrically connected in sequence;
   wherein, the battery is configured to be connected with a motherboard of the terminal to supply electric power to the terminal;
   the charging interface is configured to receive a charging current and a charging voltage;
   the control circuit is configured to control a pathway between the charging interface and the connector, so as to transfer the charging current and the charging voltage to the battery via the connector, and thereby charge the battery;
   wherein the battery is a serial dual battery, the serial dual battery is integrated in a battery protection plate, and the connector comprises a charging connector and a discharging connector;
   the charging interface is electrically connected with the charging connector via the control circuit; the charging connector is connected with the battery protection plate; the battery protection plate is electrically connected with the motherboard of the terminal via the discharging connector.

2. The charging circuit according to claim 1, wherein the control circuit comprises a switch;

the switch is configured to enable the control circuit to conduct the pathway between the charging interface and the connector, and thereby establish a connection between the charging interface and the connector.

3. A charging method applied in a terminal, wherein the terminal comprises a charging circuit, the charging circuit comprises a charging interface, a control circuit, a connector, and a battery electrically connected in sequence; the battery is configured to be connected with a motherboard of a terminal to supply electric power to the terminal; the charging interface is configured to receive a charging current and a charging voltage; the control circuit is configured to control a pathway between the charging interface and the connector, so as to transfer the charging current and the charging voltage to the battery via the connector, and thereby charge the battery;

wherein the charging method comprises:

receiving the charging current and the charging voltage by the charging interface;

controlling, by the control circuit, the pathway between the charging interface and the connector; and transferring, by the connector, the charging current and the charging voltage input from the charging interface to the battery to charge the battery;

wherein the battery is a serial dual battery, the connector comprises a charging connector and a discharging connector, the serial dual battery is integrated in a battery protection plate; and the method further comprises:

electrically connecting, by the control circuit, the charging interface with the charging connector; electrically connecting the charging connector with the battery protection plate; and electrically connecting, by the discharging connector, the battery protection plate with the motherboard of the terminal.

4. The method according to claim 3, wherein the control circuit comprises a switch; the controlling, by the control circuit, a pathway between the charging interface and the connector to conduct comprises:

enabling the control circuit by the switch to conduct the pathway between the charging interface and the connector and establish the connector between the charging interface and the connector.

5. A terminal, comprising:
a motherboard; and
a charging circuit; wherein the charging circuit comprises a charging interface, a control circuit, a connector, and a battery electrically connected in sequence; the battery is connected with the motherboard to supply electric power to the terminal; the charging interface is configured to receive a charging current and a charging voltage; the control circuit is configured to control a pathway between the charging interface and the connector, so as to transfer the charging current and the charging voltage to the battery via the connector, and thereby charge the battery;

wherein the battery is a serial dual battery; the terminal further comprises a battery protection plate, and the serial dual battery is integrated in the battery protection plate; the connector comprises a charging connector and a discharging connector, the charging interface is electrically connected with the charging connector via the control circuit, the charging connector is connected with the battery protection plate, and the battery protection plate is electrically connected with the motherboard via the discharging connector.

6. The terminal according to claim 5, wherein the control circuit comprises a switch;

the switch is configured to enable the control circuit to conduct the pathway between the charging interface and the connector, and thereby establish a connection between the charging interface and the connector.

7. The terminal according to claim 5, wherein the control circuit, the connector, and the battery are disposed between the charging interface and the motherboard.

8. The terminal according to claim 7, further comprising a flexible printed circuit board (FPC) electrically connected between the charging interface and the motherboard; wherein the charging current and the charging voltage do not flow into the motherboard via the FPC.

9. The terminal according to claim 7, further comprising a board-to-board connector (BTB) interface electrically connected between the battery and the motherboard.

10. The terminal according to claim 5, wherein the motherboard is a separated motherboard or an L-shaped integral board.

11. The terminal according to claim 5, further comprising a processor, a memory, a communication interface, and a bus; the processor, the memory, the communication interface, and the charging circuit are electrically connected with each other by the bus.

* * * * *